UNITED STATES PATENT OFFICE.

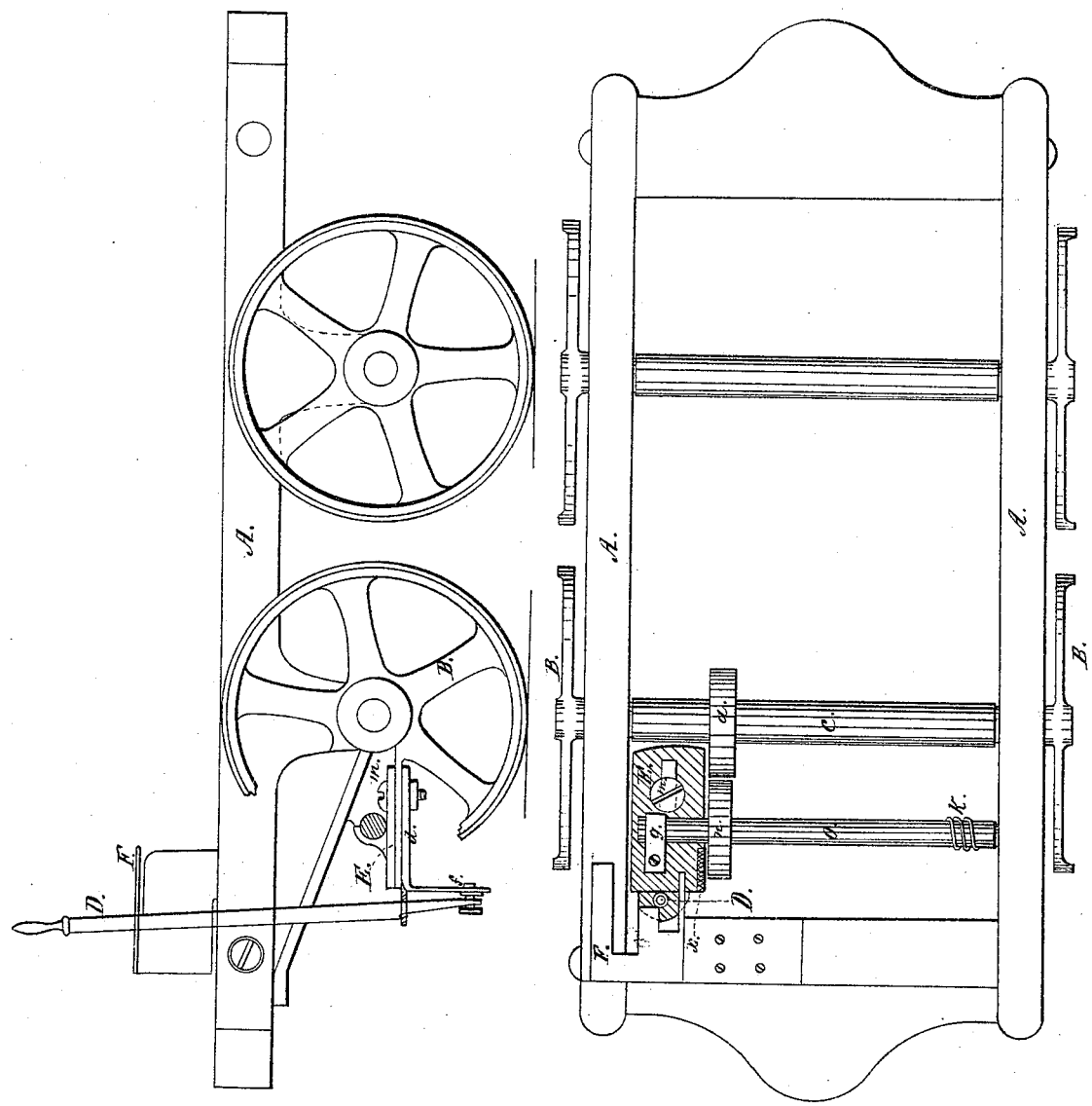

DAVID MUMMA, JR., OF HARRISBURG, PENNSYLVANIA.

MODE OF OPERATING BRAKES ON RAILROAD-CARS.

Specification of Letters Patent No. 26,117, dated November 15, 1859.

*To all whom it may concern:*

Be it known that I, DAVID MUMMA, Jr., of Harrisburg, in the county of Dauphin and State of Pennsylvania, have invented certain new and useful Improvements for Controlling Brakes of Railroad-Cars; and I do hereby declare that the following is a full, clear, and exact account of the construction and mode of operating the same, reference being had to the accompanying drawings, making a part of this specification.

The object of my improvement is to overcome in a simple and practical manner the difficulty now existing in braking a train of cars from the locomotive arising from the sudden draft or strain upon the chain operating the brake, by which it is frequently broken.

It is a matter of great importance to place the brakes under the control of the engineer and employ the power of the locomotive in operating them; with that object there has been a variety of complicated contrivances tried to overcome the jerk above alluded to.

The nature of my improvement consists in the employment of a friction wheel ($n$) secured on an auxiliary axle placed by the side of the axle of the driving wheel of the locomotive; which also carries a friction wheel ($a$) as a mate of the other. The chain operating the brakes is wound on the auxiliary axle. One end of said axle is secured in a fixed bearing but the other end or journal is in a box ($g$), upon a movable plate E. This plate is so arranged as to admit of being moved back and forward and also from side to side, through the aid of an upright lever (D) accessible to the hand of the engineer, said movements of the plate E, being for the purpose of bringing the friction wheel of the auxiliary axle to bear gradually on its fellow, and be thus driven by the axle of the driving wheel until the brake chain is sufficiently wound on the axle (O), then by a second and side movement of the plate E (which is to be furnished with a suitable shoe $x$) to press said shoe and plate against the side of the friction wheel ($n$) and hold the brakes to their work, then the upper end of the lever D may be dropped in a recess or notch in plate F, and slightly drawn back, to allow of a slight removal of the friction wheel ($n$) and its contact with its fellow wheel ($a$) on the axle of the driving wheel of the locomotive, thus to arrest the further winding of the brake chain ($k$) and also prevent the irregular wear of the periphery of ($n$) which might occur if in contact in descending long grades of the road.

A second improvement is that of attaching the brake chain to the axle ($o$) near the fixed bearing thereof, instead of placing it at the center; by this improvement I am enabled to employ the moving axle, as a lever, to overcome the draft of the chain and brakes, upon the upright lever D, when in the hand of the engineer, and enable him thereby, to more readily graduate the pressure upon the friction wheel, than could be done if the chain was otherwise attached and arranged.

To enable others skilled in the art to construct and use my improvements they may be described as follows:

A A represent the frame work of a locomotive; B B, the driving wheels and C their axle.

($a$) is a friction wheel on said axle $c$.

($d$) is a plate secured on one of the braces connected with the frame work of the locomotive.

($e$) is a projection from the underside of the plate ($d$) carrying a bearing ($f$) for the end of the upright lever D. The upper end of said lever D, rises above the platform a convenient distance.

E is a movable plate lying on the fixed plate ($d$) being secured to it by a bolt ($m$) passing through a slot in E, which allows it to be moved in all directions. The plate E is further provided with an opening through which the upright lever passes and by which it is moved. The plate E carries one of the journal boxes ($g$) of shaft or axle O.

F is a notched plate for retaining the lever D in any desired position.

$k$ is the brake-chain connected with axle, as near the fixed bearing thereof as desired; ($x$) a shoe on plate E.

In the construction of the brakes there is no peculiarity and as a modification of the improvement a friction wheel may be made to bear against the periphery of the driving wheel for the purpose of more rapidly turning the auxiliary shaft on which the brake chain is wound.

The importance of employing the pressure of plate E on the side of the friction wheel will be apparent in releasing the brakes, as then the friction may be gradually reduced and the chain eased and unwound at the will of the engineer.

Having described my improvements what I claim as my invention and desire to secure by Letters Patent is—

1. The employment of a movable plate E or its equivalent provided with a shoe $x$, when in combination with a friction wheel ($n$) a lever D and wheel ($a$) all so arranged that friction from said shoe and plate may be applied in the manner and for the purposes substantially as set forth.

2. I claim the arrangement of the brake chain attached to the axle (O) as described so that said axle may be employed as a lever for the purposes set forth.

In testimony whereof I have signed my name before two witnesses.

DAVID MUMMA, Jr.

Witnesses:
 JOHN F. CLARK,
 EDM. F. BROWN.